US009365361B1

(12) United States Patent
Skarlupka

(10) Patent No.: US 9,365,361 B1
(45) Date of Patent: Jun. 14, 2016

(54) 90 DEGREE CROSS TRANSFER CONVEYOR

(71) Applicant: Donald Bruce Skarlupka, Deerbrook, WI (US)

(72) Inventor: Donald Bruce Skarlupka, Deerbrook, WI (US)

(73) Assignee: Skarlupka Mfg., Inc., White Lake, WI (US)

( * ) Notice: Subject to any disclaimer, the term of this patent is extended or adjusted under 35 U.S.C. 154(b) by 0 days.

(21) Appl. No.: 14/755,604

(22) Filed: Jun. 30, 2015

(51) Int. Cl.
*B65G 47/54* (2006.01)
*B65G 47/64* (2006.01)

(52) U.S. Cl.
CPC .............. *B65G 47/54* (2013.01); *B65G 47/643* (2013.01)

(58) Field of Classification Search
CPC ...... B65G 47/54; B65G 47/643; B65G 21/22; B65G 15/50; B65G 15/12; B65G 13/02
USPC .............................................. 198/370.1, 809
See application file for complete search history.

(56) References Cited

U.S. PATENT DOCUMENTS

| 4,256,222 | A | 3/1981 | Gunti |
| 4,730,718 | A | 3/1988 | Fazio et al. |
| 4,962,841 | A | 10/1990 | Kloosterhouse |
| 5,743,375 | A | 4/1998 | Shyr et al. |
| 8,684,169 | B2 | 4/2014 | Itoh et al. |
| 2003/0111320 | A1* | 6/2003 | van Leeuwen ....... B65G 15/105 198/370.06 |
| 2005/0126885 | A1* | 6/2005 | Brown ................... B65G 47/54 198/370.1 |
| 2009/0255784 | A1* | 10/2009 | Kuhn ..................... B65G 47/54 198/598 |
| 2010/0072026 | A1* | 3/2010 | Russell ................. B65G 47/54 198/369.1 |
| 2014/0262684 | A1 | 9/2014 | Skanse et al. |
| 2014/0291114 | A1* | 10/2014 | Artz ..................... B65G 47/244 198/369.6 |

OTHER PUBLICATIONS

RBT3 3 Strand 90 Degree Round Belt Transfer, www.conveyor-parts.com.
P. 6 of "Considerations When Selecting a 90-Degree Sortation System," "Low-to Mid-rate Sorters," (c) 2011, Intralox, L.L.C.

* cited by examiner

*Primary Examiner* — Mark A Deuble
(74) *Attorney, Agent, or Firm* — Stiennon & Stiennon

(57) ABSTRACT

A transverse belt drive assembly has multiple belt drive frames spaced in a first direction and positioned between the rollers of a main conveyor which advances articles in the first direction. The belt drive frames support looped toothed belts which are advanced in a second direction perpendicular to the first direction. The belt drive frames are mounted to a platform which is driven on demand by an actuator to raise the belt drive frames to extend up above the roller surfaces of the main conveyor rollers causing the belts to engage articles carried on the conveyor rollers, lifting and advancing the articles in the first direction to transfer them off the conveyor rollers. Each belt has a body with converging walls and is received within a channel within a converging side wall track mounted to a belt drive frame. Rotatable bearings are mounted beneath each channel to support the belt.

19 Claims, 6 Drawing Sheets

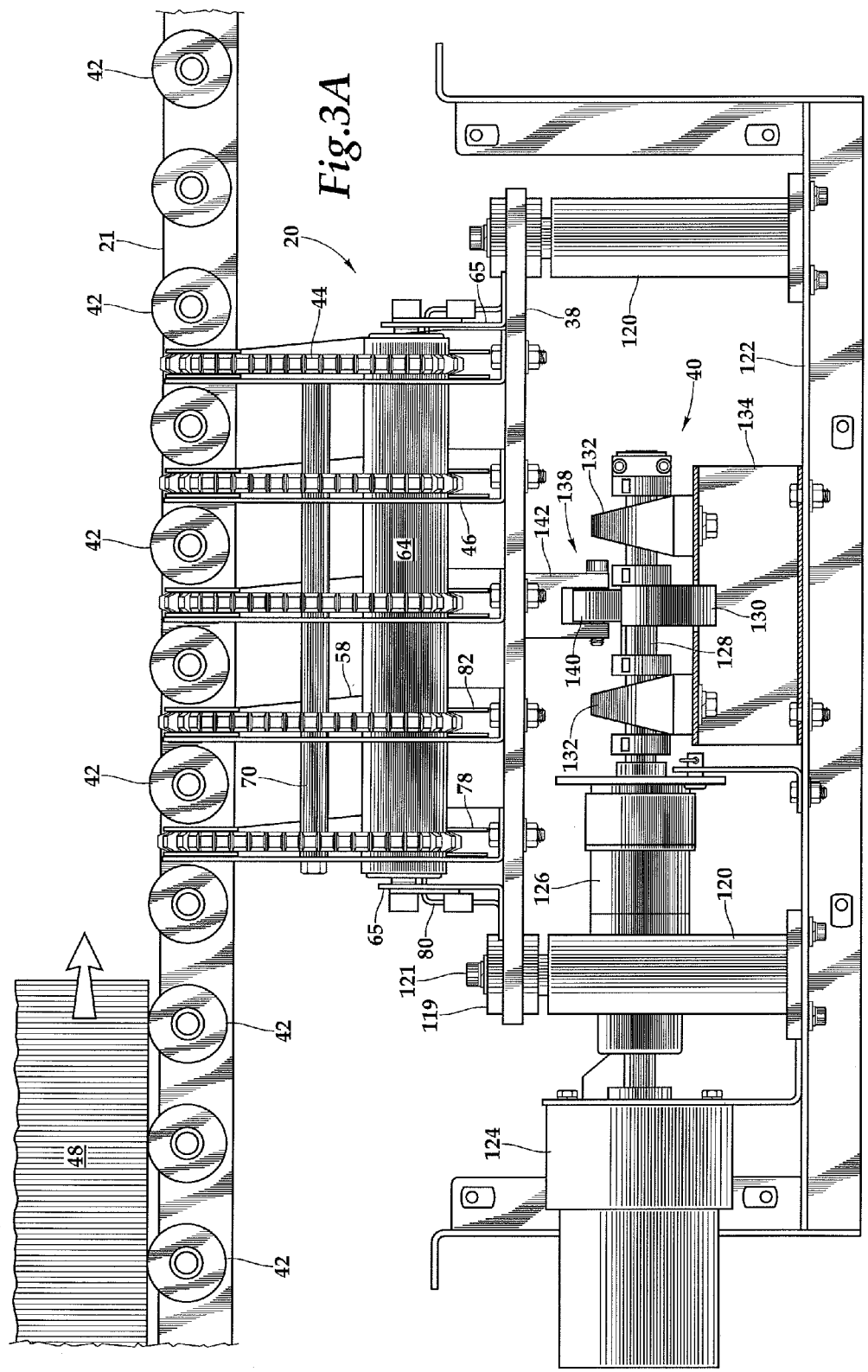

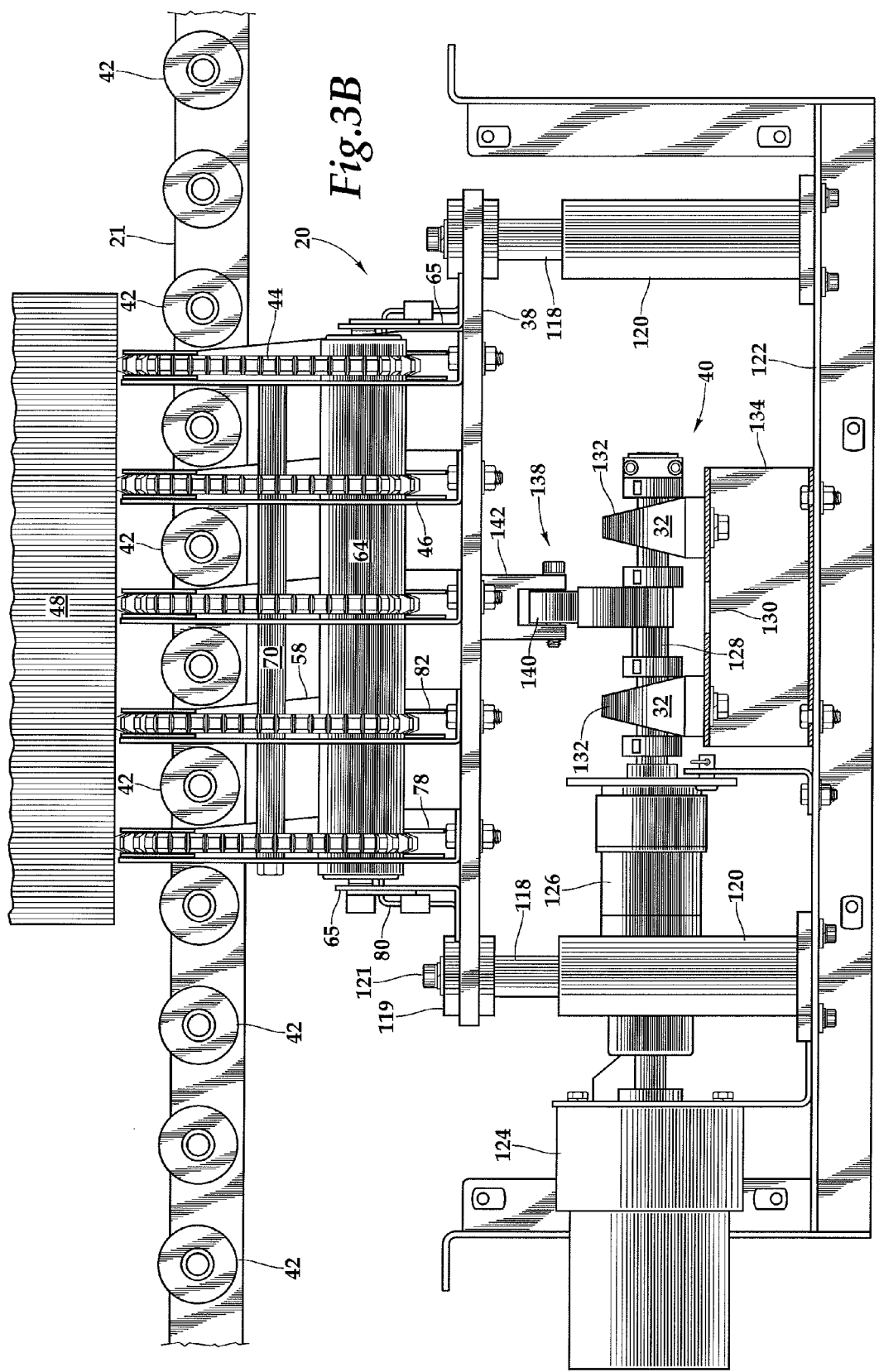

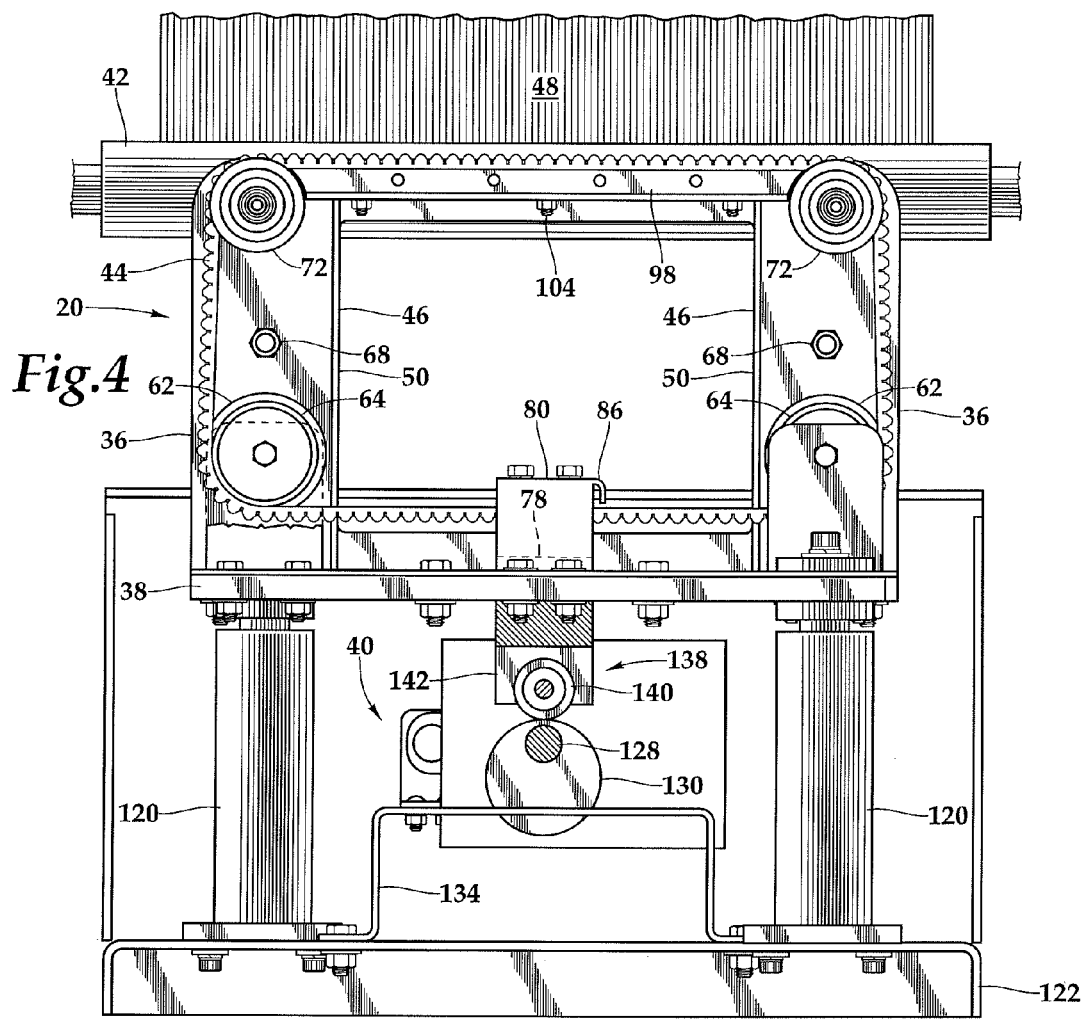
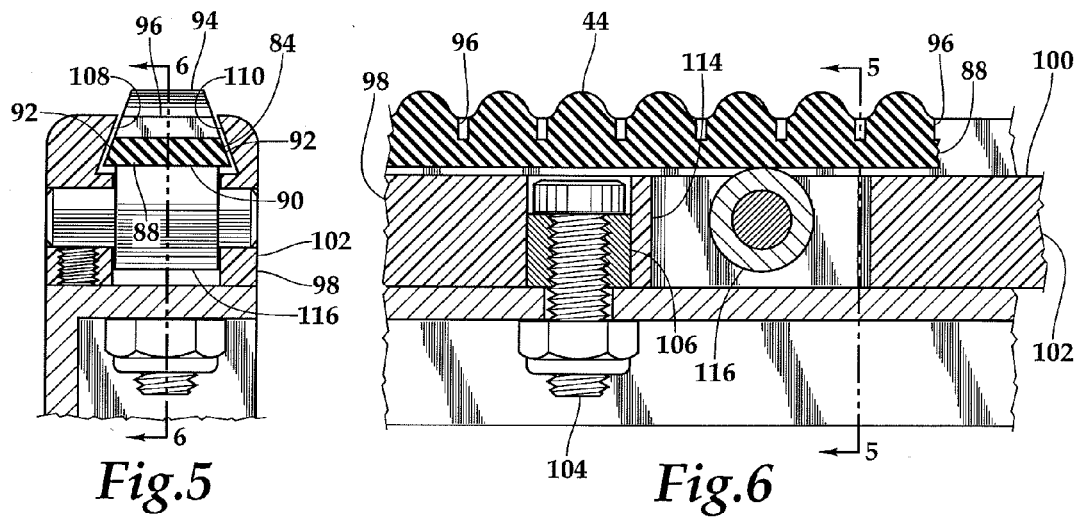

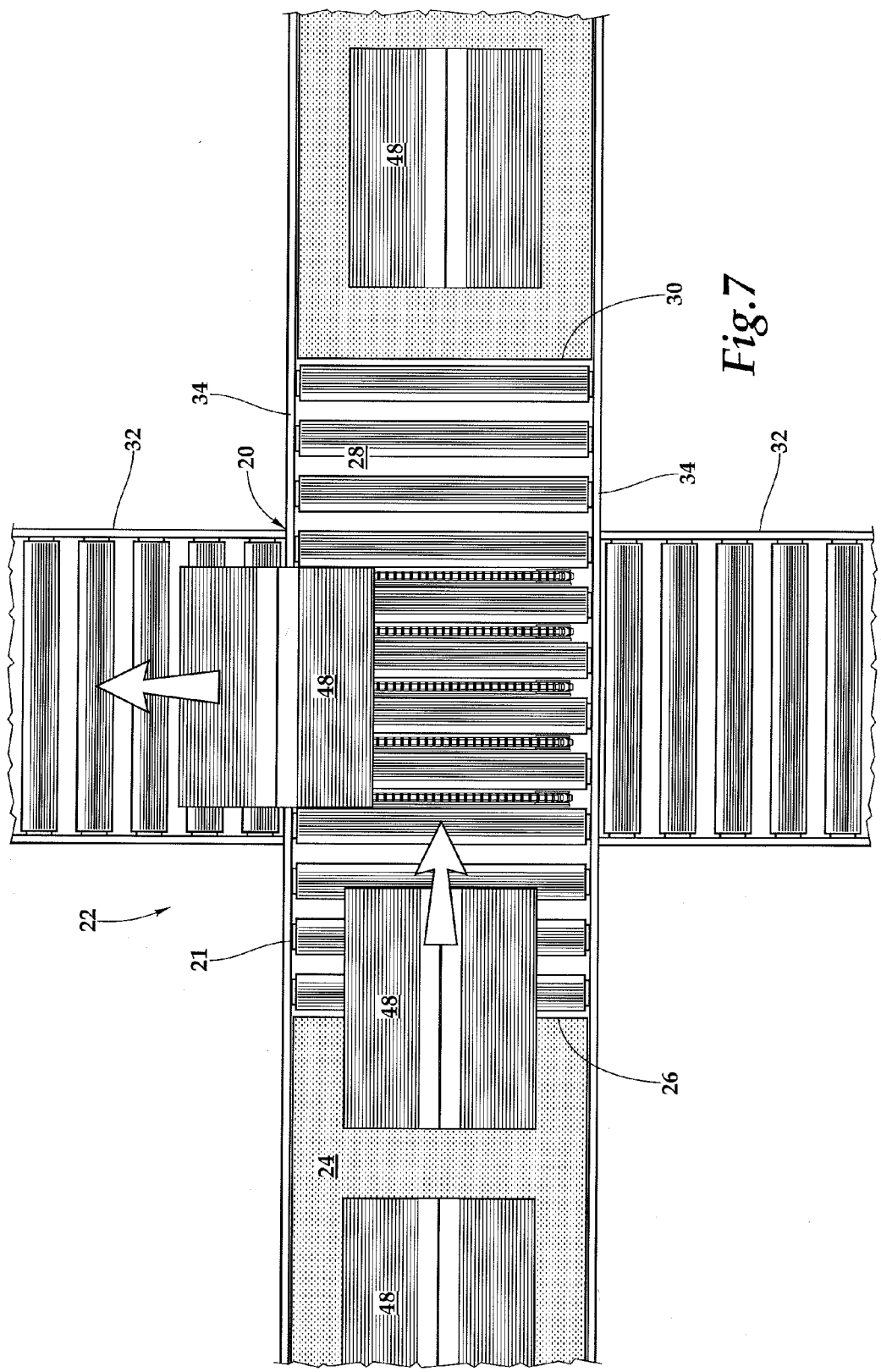

90 DEGREE CROSS TRANSFER CONVEYOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors in general and to 90° cross transfer conveyors in particular of the type which use two or more narrow belts that pop up between the rollers of a roller conveyor line. Ninety-degree cross transfer conveyors are often used to replace mechanical diverters which push items off a main conveyor by pushing or by striking the object being conveyed. A disadvantage of mechanical diverters is that they can damage the more delicate items in the boxes or totes which are being sorted, and move packages in only one direction.

In modern commerce, especially with the rise of the Internet and international trade, the number of packages shipped in a year is many billions and a single company may deliver over 25 million packages a day. Each package starts out from a source which may be an individual or may be a major online retailer and needs to travel across the country or around the world to an individual or business recipient. The most efficient process is to use one or more sorting regional sorting centers where packages from numerous sources are brought together and sorted into groups of packages with destinations in a limited geographical area such as a county or city. In the sorting center packages are unloaded from trucks, trains, or shipping containers onto a conveyor. As the packages move along the conveyor, optical character recognition systems or barcode readers identify the destination of each package which can then be diverted or sorted by transferring an identified package to a perpendicular path using a cross transfer conveyor. Often, especially for large shippers of packages, multiple regional sorting centers are used where the packages from the various sources are sorted according to whether the packages have a local delivery destination, or a destination served by a regional sorting center. A package may pass through more than one node of the delivery system. For overnight or air delivery, expedited shippers may use a single sorting center where all packages shipped in a particular day are transported by air, the planes unloaded, the packages are sorted, and returned on the same airplanes to their delivery destination.

When the package or item reaches a destination delivery service, the packages are again sorted according to various delivery routes and loaded onto delivery vehicles which provide the final delivery. The destination delivery services also use a conveyor arrangements to sort the packages using automated sorting systems which employ conveyors and cross conveyor diverters as means for sorting the packages for final delivery. Even within a single factory parts, often contained in totes, and finished products ready for shipping may be most economically handled by a conveyor system which sorts and delivers parts to various workstations, and collects and delivers finished products to various shipping docks from which the product is delivered to a delivery truck, a shipping container or to a collection point for a shipping service.

Conventional 90° cross transfer conveyors of the type which use a plurality of narrow belts that pop up between the rollers of a roller conveyor line generally employ belts which are like large rubber bands or O-rings that ride on pulleys attached to a vertical shelf which is raised between the rollers of the main conveyor by a pneumatic piston. In such an arrangement a package or tote on the main conveyor which is positioned over the cross transfer conveyor is engaged by the pulley supported belts when the cross conveyor shelves are driven vertically. The pop-up belts thus lift the conveyed article just above the roller conveyor line rollers. The article then rides on belts and are driven to the right or to the left at a 90° angle to the main conveyor thereby delivering the package or tote to a subsequent conveyor to the left or to the right.

In modern sorting applications, where packages can be moving 135 feet per minute (FPM) along the main conveyor, the cross transfer conveyor belts must rapidly bring the package to a stop so that the package rests on the belts and can be driven in the cross direction to a sideward downstream conveyor. The moving packages, which may weigh upwards of 100 pounds, deliver a substantial sideward force to the transfer conveyor belts when they strike them, which causes the belts to occasionally come off the pulleys on which they are supported, causing downtime for an entire main conveyor. The consequent delay in package delivery and lost work hours can be significant.

What is needed is an improved 90° cross transfer conveyor of greater reliability.

SUMMARY OF THE INVENTION

A 90° cross transfer conveyor has a transverse belt drive assembly which has multiple belt drive frames spaced in a first direction and positioned between the rollers of a main conveyor which advances articles in a first direction. The drive frames support flexible toothed belts which are advanced in a second direction perpendicular to the first direction. The belt drive frames are mounted to a platform which is driven on demand by a mechanical eccentric cam actuator to raise the belt drive frames to extend up above the roller surfaces of the parallel rollers causing the belts to engage articles carried on the conveyor rollers, to arrest their forward motion in the first direction, to lift the articles and advance them in the second direction to transfer them off the conveyor rollers to a divert slide or conveyor. Each toothed belt has a body with converging walls and is received within a belt channel within a converging side wall track which positively locks the belts to the belt drive frame to which the belt channel is mounted. Needle bearings are mounted in the belt channel to support the belt. The inverted V-belt teeth extend outwardly of the belt loop. The smooth interior surfaces of the belts are driven, not by a sprocket or a gear, but extend down to wrap around two spaced reversible motorized rollers which extend through the lower portions of the belt drive frames. As the belts traverse from one motorized roller to the other the their lateral position on the drive rollers is controlled by centering guides which are mounted to a bracket which extends across the belt drive frames.

It is an object of the present invention to provide a 90° cross transfer conveyor which is raised and lowered by a motor driven eccentric cam.

It is a further object of the present invention to provide a 90° cross transfer conveyor which is more reliable.

It is another object of the present invention to provide a 90° cross transfer conveyor which fits between the sidewalls of the main conveyor.

It is another object of the present invention to provide a 90° cross transfer conveyor which can be designed for a range of main conveyor widths.

Further objects, features and advantages of the invention will be apparent from the following detailed description when taken in conjunction with the accompanying drawings.

BRIEF DESCRIPTION OF THE DRAWINGS

FIG. 3A is a side elevational view of the transverse conveyor of FIG. 1 in a lowered configuration.

FIG. 3B is a side elevational view of the transverse conveyor of FIG. 1 in an elevated configuration.

FIG. 4 is an end elevational view of the transverse conveyor of FIG. 3A.

FIG. 5 is a cross-sectional view of a conveyor belt within a track of the transverse conveyor of FIG. 4 taken along section line 5-5.

FIG. 6 is a cross-sectional view of the conveyor belt with a track of the transverse conveyor of FIG. 5 taken along section line 6-6.

FIG. 7 is a top plan view of a conveyor system incorporating the transverse conveyor of this invention.

DESCRIPTION OF THE PREFERRED EMBODIMENTS

Figure 1:
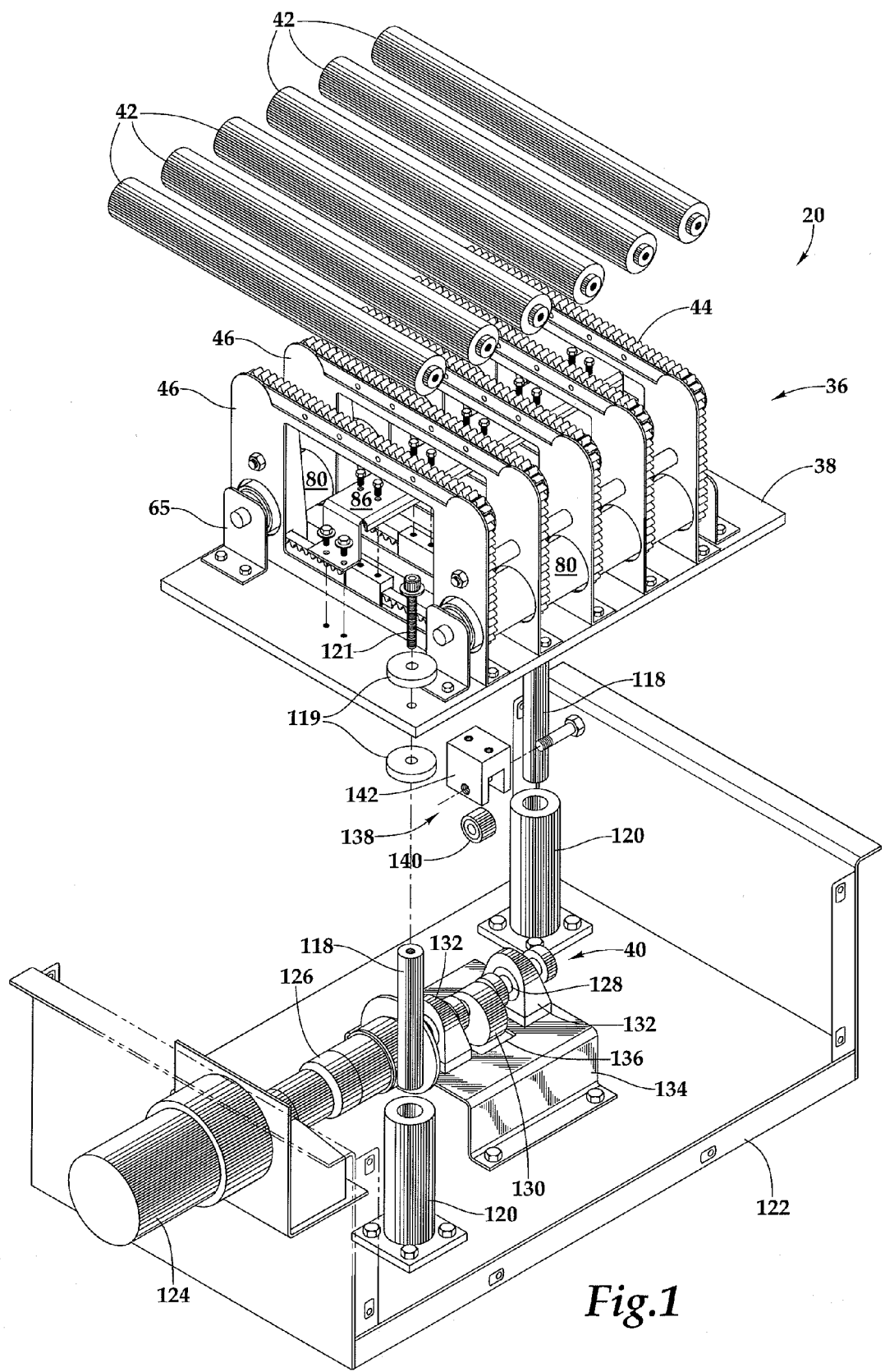
FIG. 1 is an exploded isometric view of the transverse conveyor of this invention.

Referring more particularly to FIGS. 1-7, wherein like numbers refer to similar parts, a cross transfer conveyor 20 is shown in FIG. 1. The transfer conveyor 20 is used within a conveyor system 22, shown in FIG. 7, which has a main conveyor line 21 which advances articles in a first direction. The main conveyor line 21 has an infeed conveyor portion 24 which brings articles moving in a first direction to an inlet 26 of a roller conveyor portion which joins to an in-line outfeed portion 28 of the main conveyor. The infeed and outfeed portions may be comprised entirely of rollers, or may transition to wide belts. As shown in FIG. 3A, the transfer conveyor 20 has a transverse belt drive assembly 36 with portions mounted between parallel rolls 42 forming the main conveyor line 21. When the transverse belt drive assembly 36 is positioned completely below the surface of the rolls 42, the main conveyor 21 carries articles from the infeed conveyor portion 24 across the rollers 42 to the outlet portion 30 of the main conveyor along a path in the first direction. Side conveyors 32 are adjacent to and extend away from each side 34 of the main conveyor, and receive articles which are diverted by the cross transfer conveyor 20 for movement to the right or left in a second direction which is perpendicular to the first direction.

The cross transfer conveyor 20 transverse belt drive assembly 36 is mounted to an elevator platform 38 which is driven by an actuator 40 between a lowered configuration, shown in FIG. 3A, in which an article travels across the parallel rollers 42 in the first direction unimpeded by the belt drive assembly, and an elevated configuration, shown in FIG. 3B, in which the belt drive assembly is raised to bring five parallel belts 44 into engagement with articles carried on the rollers 42 to drive the article in the second direction either to the left or to the right, carrying out a ninety-degree change in direction of the article's path through the conveyor system 22. The belts 44 have outwardly projecting teeth 94.

As shown in FIG. 3A, the transverse belt drive assembly 36 has five similar drive frames 46 which are fastened to the elevator platform 38 which may be, for example, a rectangular metal plate. The drive frames 46 are spaced apart sufficiently in the first direction that rollers 42 of the roller conveyor portion of the main conveyor 21 fit between two drive frames without touching the frames. In the lowered configuration the belts 44 mounted on the drive frames are retracted below the uppermost portions of the parallel rollers 42 such that an article 48 conveyed thereon travels along the transfer conveyor in the first direction unimpeded by the transfer belt drive assembly 36.

Figure 2:
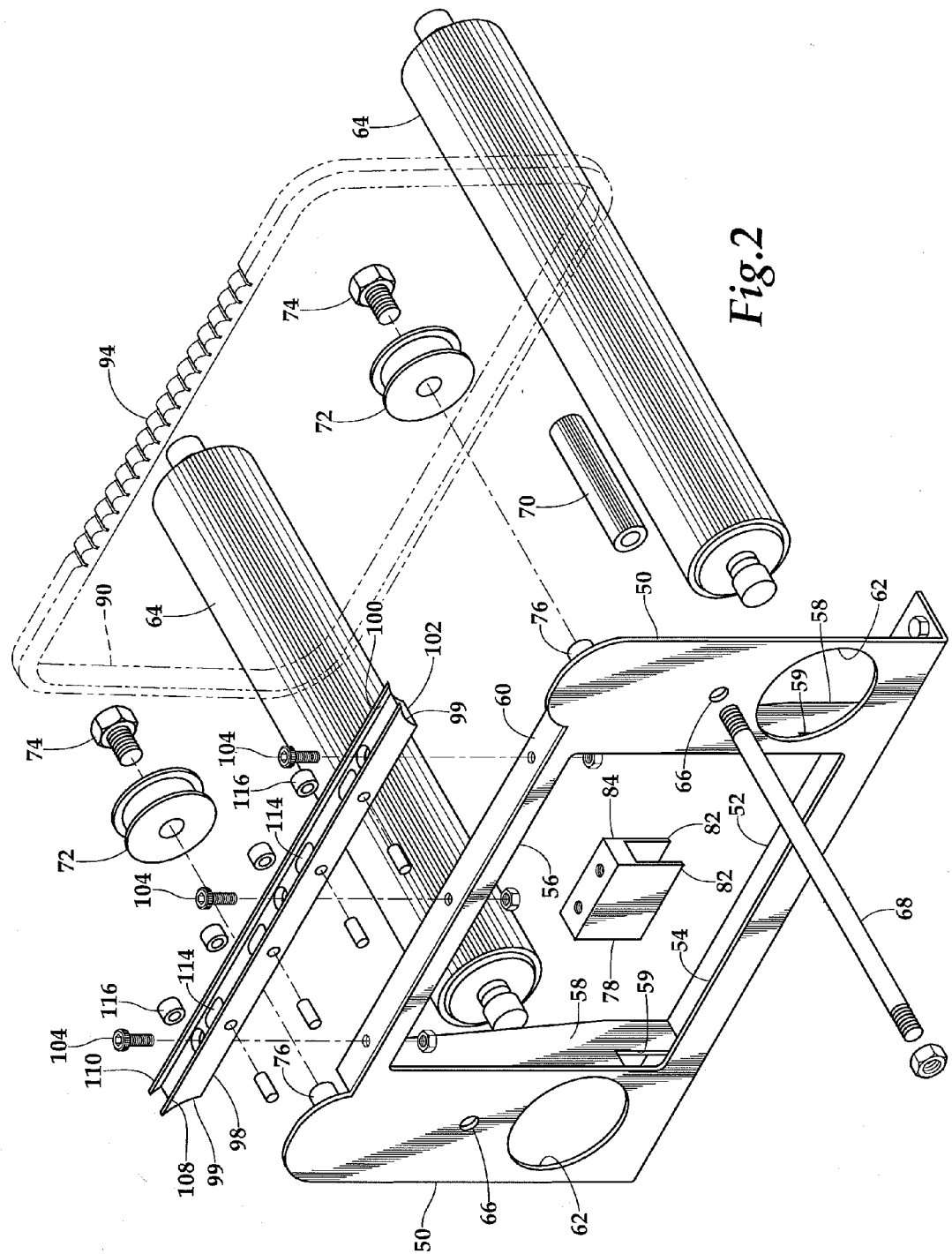
FIG. 2 is an exploded isometric view of a belt conveyor assembly of the conveyor of FIG. 1.

As shown in FIG. 2, each drive frame 46 has two upright segments 50 which extend upwardly from a lower flange 52 and which are joined by a lower segment 54 and an upper segment 56. An upper track flange 60 extends between the two upright segments 50 and is connected to the upper segment 56. Two vertical braces 58 extend between the track flange 60 and the lower flange 52. Belt openings 59 are formed at the base of each brace 58. Each upright segment 50 has a lower circular opening 62 through which motorized rollers or drive pulleys 64 extend as is shown in FIG. 3A. Bolt holes 66 are formed in each upright segment 50 above the lower circular openings 62. Two lag bolts 68 extend through the two sets of aligned bolt holes 66, and spacers 70 are supported on the bolts between each pair of drive frames 46, and are secured between the belt support frames to stiffen the transverse belt drive assembly 36 structure so as to withstand lateral loads applied to the belt support frames. Boxes or totes which weigh upward of 75 to 100 pounds strike the upwardly extending teeth of the belts 44 with speeds of up to about 135 feet per minute (FPM) before the boxes or totes ar brought to a stop in the first direction. The loads on the upwardly extending teeth of the belt 44 transfer the braking force to the belt support frames through belt guides mounted to the upper track flanges 60.

Two freely rotating pulleys 72 are fastened by bolts 74 to internally threaded stub shafts 76 which extend from each of the upright segments 50 at a position which positions uppermost portions of the pulleys 72 level with the upper edges the track flange 60. The belt 44 is a continuous unbroken loop, as shown in FIG. 2, and may be formed of a polymer such as polyurethane which can be easily welded such as by using a hot knife. The belt 44 is resilient and is mounted to pass over the two free pulleys 72 and around the two belt drive pulleys 64. Each belt 44 is cut to length and then the cut ends are welded together in place to form an appropriately dimensioned belt loop which engages the drive pulleys 64 with sufficient tension to turn readily without significant slipping. In the event that a belt stretches over time, a small section of the belt, for example about one quarter inch, can be cut out and the belt rewelded in place about the pulleys.

Lower belt guides 78, shown in FIG. 2, are positioned with respect to each belt 44 as it travels between the two drive rolls 64, as shown in FIGS. 1 and 4. Each lower belt guide 78 may be formed of plastic and has a body 84 which is bolted to the longitudinally extending main plate 86 of a guide support bracket 80. The belt guides 78 have downwardly extending legs 82 which receive the belt therebetween. The guide support bracket 80 is fastened to the elevator platform 38 and holds the belt guides 78 in position above each belt 44. The drive rollers 64 extend through all the belt drive frames 46 and may be mounted to the elevator platform 38 at their ends by brackets 65. The drive rollers may be internally driven motorized rollers, such as the ones disclosed in U.S. Pat. No. 6,244,427, the disclosure of which is incorporated by reference herein.

As shown in FIGS. 5 and 6, each belt 44 defines a running direction along the belt loop, and has a body 88 which extends perpendicular to the running direction along the belt loop which is in cross-section an isosceles trapezoid, widest at the base of the trapezoid which forms an interior belt surface 90 which faces inwardly of the belt loop, and narrowest at the top surface of the trapezoid. The belt body 88 has two inwardly angled sides 92 spaced from one another by the trapezoidal base and top base. The sides 92 converge at the same angle (e.g., about 15° from the vertical) towards one another as they extend away from the interior surface 90.

A plurality of lobed teeth 94 project outwardly of the belt 44 and are spaced from one another in the running direction. The teeth 94 extend outwardly from the trapezoidal cross-sectioned body the belt 44. The teeth 94 are separated from one another by intervening slots 96 which may be formed in the belt or cut therein. The slots 96 facilitate the flexibility of the belt 44 as it turns about the free pulleys 72 and the drive pulleys 64, and reduce the bending stress which would be experienced if the belt section were uniformly thicker. In a preferred embodiment, the belt 44 may be 39 inches long. The height of the body 88 from the interior surface 90 to the bottom of the slots 96 is about ⅛ inch, giving the belt the flexibility to turn around the pulleys 64, 72, while the uppermost portions of the teeth 94 are about 0.34 inches above the interior surface 90. The slots 96 may be about 0.045 inches wide in the running direction of the belt. The width of the belt at the interior surface 90 in a direction perpendicular to the running direction may be about 0.52 inches, while the width of the belt at the top of the teeth may be about 0.31 inches.

Because the belt 44 is in the form of an inverted V-shaped timing belt wherein the teeth, normally used to perform a timing function when driven by a sprocket or gear, are used to engage the packages or totes which move along the main conveyor, the flat interior surface 90 of the belt 44 is driven by the drive rolls 64 and the lower belt guides 78 function to control the lateral position of the belt on the surfaces of the drive pulleys 64.

A box or tote 48 which is moving at a given velocity in the first direction on the infeed portion of the main conveyor 24 must have its movement in the first direction brought to a halt by the cross transfer conveyor 20 so it can be driven at right angles to the main conveyor by the belt drive assembly 36 and transferred to one of the side conveyors 32. Thus the belts must engage the article 48, which may be a shipping box, loaded tote, or tray filled with mail, or some other object which may weigh up to 75-100 pound. The force of the impact of the article 48 is absorbed by the belts 44 which are at risk of being displaced in the first direction from their paths in the transverse second direction. The belts 44 are guided and retained in their paths by upper guide tracks 98 which are positioned on each belt drive frame 46 along the path between the two free pulleys 72. The track has radiused concave end portions 99 which allow clearance for the free pulleys 72 to allow the tracks to approach more closely to the pulleys.

Each track 98 has a channel 100 through which the belt extends. The track 98 has a base segment 102 secured to the belt drive frame 46 upper track flange 60 with a plurality of countersunk bolts 104 which may extend through threaded metal inserts 106 which are secured within the track. The track 98 forms an interior opening having a cross-section of an isosceles trapezoid, along which the belt 44 moves. The track has a lower wall 108 which engages the upper segment 56 of the belt drive frame. The trapezoidal opening has two side walls 108 and 110 which converge towards one another so as to be parallel to the converging sides of the trapezoidal belt body 88 of the belt received within the channel. Each channel wall 108, 110 and each side 92 of the belt 44 may be inclined from 5 to 30 degrees and preferably about 15 degrees from the vertical.

The track has a plurality of openings 114, shown in FIG. 6, each of which receives a rotatable roller bearing 116, such as a needle bearing. The roller bearings 116 support the belts as they engage the interior surface 90 of the belt for reduced friction as the belts are advanced bearing the weight of the overlying articles 48. The bearings may be double sealed needle roller bearings to aid the belt support of heavy loads in excess of 100 pounds.

As shown in FIG. 3A, the elevator platform 38 is fastened by bolts 121 to two inner guide rods 118 located at opposite corners of the platform, with washers 119 on either side of the platform. The guide rods 118 extend within outer guide shafts 120 to function as linear bearings for the vertical movement of the platform. The guide shafts 120 are fixed to a base 122 of the conveyor 20. Also fastened to the base 122 is the actuator 40. The actuator is comprised of a gear motor 124 the output shaft of which is coupled with a LoveJoy jaw type L coupler to a brake/clutch 126 to selectively drive a shaft 128 to which a cam 130 is mounted. The shaft 128 extends through two pillow blocks 132 which extend upwardly from a mounting box 134 which is fastened to the base 122 and which has a clearance hole 136 which receives the cam 130. The clutch 126, shown in FIG. 4, may be a solenoid activated wrap spring clutch and brake, such as the CB6 unit with two brake control tangs manufactured by Warner Electric set to rotate the shaft 128 in 180° increments to first raise and then lower the transverse belt drive assembly 36. A cam follower 138 is mounted to the underside of the elevator platform 38 which supports a roller 140 within a bracket 142. The roller 140 rotates about an axis which is parallel to the axis of the cam mounting shaft 128. The gear motor 124 and all electric components on the cross transfer conveyor 20 are 24 volt DC powered which improves maintenance safety.

The motor is continuously driven and the clutch is actuated by a controller, not shown, which selectively raises and lowers the elevator platform 38 to bring the belts of the transverse belt drive assembly 36 into engagement with an article 48. The elevator platform may be raised to cause the teeth of the belts to protrude about 1.5 inches above the rollers of the main conveyor 21. The controller also activates the drive pulleys to drive the belts to move to the left or to the right to thereby direct an article to one or the other of the two side conveyors 32. The controller will generally receive a signal indicating a time and direction based on a sensor positioned before the transfer conveyor along the main conveyor. The controller may receive inputs from devices such as optical character recognition systems or barcode readers which identify the destination of each package in combination with a sensor which provides a timing signal based on the position of the incoming article. Such inputs are used by the controller to raise and drive the belt drive assembly 36 of the transfer conveyor 20 to divert boxes, totes or other conveyed items to one of the side conveyors 32. Alternatively, the controller may be linked to a manual control to allow an operator to divert articles in real time.

In operation, for example in the sorting facility of a shipper, articles such as cartons or totes are advanced in a continuous process along the main conveyor line 21. When the controller receives information from various sensors indicating that a particular article should be diverted, the elevator platform is driven by the actuator at the correct time to raise the transverse belt drive assembly 36 upwardly on the elevator platform to obstruct the path of the article along the main conveyor line. The momentum of the article as well as its continued partial engagement with the main conveyor line drives it up onto the projecting teeth of the belts of the transverse belt drive assembly. Removed from the driving force of the main conveyor line, the article is brought to a halt in the first direction, while it is advanced in the second direction by the rotation of the belts. The drive rollers 64 are controlled by the controlled to rotate in one direction or the other, depending on whether the article is to be discharged to a side conveyor 32 on one side or the other of the main conveyor line 21.

The ninety-degree cross transfer conveyor may then be expected to operate thousands of times per day, with the looped belts being impacted repeatedly by the conveyed articles. The looped belts 44, securely retained within the track channels 100, contribute to the reliable operation of the apparatus. Moreover, the true 100 percent 24-Volt DC controlled apparatus does not require any pneumatics, and is capable of transferring product with weights in excess of 100 pounds. The conveyor may have a throughput capability in excess of 65 sorts per minute with a 100 percent duty cycle. The transfer conveyor construction supports very high reliability, and is preferably constructed with sealed bearings that do not require lubrication. The converging belts within tracks, like a captured dovetail arrangement, prevents belt peel off when transferring product. The cogged and segmented V-transfer belts 44 permit the belt to make tight radius bends, while giving positive traction to the engagement with the conveyed product.

It should be noted that the aligned belt drive frames of the belt drive assembly have coaxial central openings defined between the upper segment 54 and the lower segment 54 and between the spaced upright segments 50. The unobstructed volume can be used to extend a drive belt therethrough to apply a driving force to overhead rollers when it is desired to use the transfer belt drive assembly with freely rotating main conveyor rollers which are driven by an underlying belt or belts, such as the 8-inch drive belts used in belt-driven live roller conveyors.

It is understood that the invention is not limited to the particular construction and arrangement of parts herein illustrated and described, but embraces all such modified forms thereof as come within the scope of the following claims.

I claim:

1. A conveyor assembly comprising:
a base;
an elevator platform positioned above the base for vertical motion with respect to the base;
an actuator which extends between the base and the elevator platform and which is operable to raise and lower the elevator platform;
a plurality of belt drive frames mounted to the elevator platform, the belt drive frames being spaced from one another in a first direction;
a track mounted to each belt drive frame, wherein each track has an upwardly opening channel; and
a looped belt mounted to each belt drive frame for advancement in a second direction which is perpendicular to the first direction, each belt extending within a track channel, wherein each belt has a plurality of teeth which project upwardly above the track and above the belt drive frame, wherein each looped belt is driven by at least one drive motor mounted to the elevator platform to move with the elevator platform, the looped belts being driven to advance together in the second direction for engaging an article to be conveyed in the second direction, and wherein the elevator platform is actuatable to retract the belts below a surface defined by a plurality of spaced parallel rollers which extend in the second direction to define a main conveyor for advancing articles in the first direction, such that an article may be conveyed above the belts in the first direction by the main conveyor, and the elevator platform is actuatable to extend the belts above said main conveyor surface to lift an article from the main conveyor and advance it in the second direction.

2. The conveyor assembly of claim 1 wherein each belt drive frame has pulleys mounted thereto on opposite ends of the track, the belt traveling around the pulleys to pass around at least one drive roller, the drive roller rotating to cause the belt to advance through the track.

3. The conveyor assembly of claim 2 further comprising a guide support bracket mounted to the elevator platform extending beneath the tracks of the belt drive frames, and wherein a guide member is mounted to the guide support bracket with respect to each belt as it extends below the at least one drive roller, each guide member having two guide walls spaced in the first direction and positioned on opposite sides of an associated one of the looped belts, thereby restricting the displacement of said associated belt in the first direction.

4. The conveyor assembly of claim 1 wherein the at least one drive motor is part of a motorized roller mounted to the elevator platform, the drive roller having two mounting ends which are mounted to the elevator platform at the two mounting ends by brackets, and wherein each looped belt is mounted to engage and be driven by the drive roller.

5. The conveyor assembly of claim 1 wherein there are two drive motors, each contained within one of two motorized rollers mounted to the elevator platform, the two drive rollers each having two mounting ends and extending through all the belt drive frames and being mounted to the elevator platform at their two ends by brackets; and
wherein each looped belt is resilient and is mounted to pass around the two drive rollers and to engage and be driven by the drive rollers.

6. A conveyor assembly comprising:
a base;
an elevator platform positioned above the base for vertical motion with respect to the base;
an actuator which extends between the base and the elevator platform and which is operable to raise and lower the elevator platform;
a plurality of belt drive frames mounted to the elevator platform, the belt drive frames being spaced from one another in a first direction;
a track mounted to each belt drive frame, wherein each track has an upwardly opening channel;
a looped belt mounted to each belt drive frame for advancement in a second direction which is perpendicular to the first direction, each belt extending within a track channel, wherein each belt has a plurality of teeth which project upwardly above the track and above the belt drive frame wherein each looped belt is driven by at least one drive mounted to the elevator platform, the looped belts being driven to advance together in the second direction for engaging an article to be conveyed in the second direction, and wherein the elevator platform is actuatable to retract the belts below a surface defined by a plurality of spaced parallel rollers which extend in the second direction to define a main conveyor for advancing articles in the first direction, such that an article may be conveyed above the belts in the first direction by the main conveyor, and the elevator platform is actuatable to extend the belts above said main conveyor surface to lift an article from the main conveyor and advance it in the second direction;
wherein each belt further comprises:
a body having an interior surface;
the plurality of teeth projecting outwardly from the body and spaced from one another in a running direction, wherein the body has two sides spaced from one another in a direction perpendicular to the running direction, and wherein the sides converge towards one another as they extend towards the teeth from the interior surface.

7. The conveyor assembly of claim 6 wherein the plurality of teeth are separated from one another by intervening slots.

8. The conveyor assembly of claim 6 wherein each track channel is defined between two channel walls which are spaced in the first direction, and wherein the channel walls converge towards one another as they extend upwardly, so as to receive the body of a belt therein.

9. A conveyor assembly comprising:
a base;
an elevator platform positioned above the base for vertical motion with respect to the base;
an actuator which extends between the base and the elevator platform and which is operable to raise and lower the elevator platform;
a plurality of belt drive frames mounted to the elevator platform, the belt drive frames being spaced from one another in a first direction;
a track mounted to each belt drive frame wherein each track has an upwardly opening channel;
a looped belt mounted to each belt drive frame for advancement in a second direction which is perpendicular to the first direction, each belt extending within a track channel, wherein each belt has a plurality of teeth which project upwardly above the track and above the belt drive frame, wherein each looped belt is driven by at least one drive mounted to the elevator platform, the looped belts being driven to advance together in the second direction for engaging an article to be conveyed in the second direction, and wherein the elevator platform is actuatable to retract the belts below a surface defined by a plurality of spaced parallel rollers which extend in the second direction to define a main conveyor for advancing articles in the first direction, such that an article may be conveyed above the belts in the first direction by the main conveyor, and the elevator platform is actuatable to extend the belts above said main conveyor surface to lift an article from the main conveyor and advance it in the second direction;
wherein each belt further comprises:
a body having an interior surface;
the plurality of teeth projecting outwardly from the body and spaced from one another in a running direction; and
wherein the track comprises a base segment with wall segments projecting upwardly therefrom and spaced in the first direction from one another to receive the belt therebetween, and wherein a plurality of rotatable bearings are mounted within openings formed in the base segment to rotate about axes extending in the first direction, such that the interior surface of the belt body engages the bearings to support the belt as it extends through the track.

10. A conveyor assembly comprising:
a base;
an elevator platform positioned above the base for vertical motion with respect to the base;
an actuator which extends between the base and the elevator platform and which is operable to raise and lower the elevator platform;
a plurality of belt drive frames mounted to the elevator platform, the belt drive frames being spaced from one another in a first direction;
a track mounted to each belt drive frame, wherein each track has an upwardly opening channel;
a looped belt mounted to each belt drive frame for advancement in a second direction which is perpendicular to the first direction, each belt extending within a track channel, wherein each belt has a plurality of teeth which project upwardly above the track and above the belt drive frame, wherein each looped belt is driven by at least one drive mounted to the elevator platform, the looped belts being driven to advance together in the second direction for engaging an article to be conveyed in the second direction, and wherein the elevator platform is actuatable to retract the belts below a surface defined by a plurality of spaced parallel rollers which extend in the second direction to define a main conveyor for advancing articles in the first direction, such that an article may be conveyed above the belts in the first direction by the main conveyor, and the elevator platform is actuatable to extend the belts above said main conveyor surface to lift an article from the main conveyor and advance it in the second direction;
wherein the actuator comprises:
a motor mounted to the base;
a cam mounted on a cam shaft which rotates about an axis, the cam having exterior cam surface portions which are radially more distant from the axis than other exterior cam surface portions;
a clutch which selectively engages the motor with the cam shaft; and
a cam follower roller mounted within a bracket, wherein the bracket is fixed to a downwardly facing underside of the elevator platform, wherein the cam follower roller engages the exterior cam surface portions, such that when the cam follower roller engages the radially more distant portions, the elevator platform is elevated a greater distance above the base than when the cam follower roller engages the other exterior cam surface portions.

11. A transfer conveyor assembly for use with a main conveyor having a plurality of spaced parallel rollers defining a main conveying surface, the transfer conveyor assembly comprising:
a base;
an elevator platform mounted to the base for vertical motion;
an actuator which engages the elevator platform and which is operable to raise and lower the elevator platform;
a plurality of belt drive frames mounted to the elevator platform, the belt drive frames being spaced from one another in a first direction;
a plurality of tracks, one track mounted to each belt drive frame, wherein each track has two walls which converge towards each other as they extend upwardly, wherein a converging upwardly opening channel is defined between the two walls; and
a looped belt mounted to each belt drive frame for advancement in a second direction which is perpendicular to the first direction, each belt having a body with sides which converge as they extend upwardly, each belt extending within one of the track channels, wherein each belt has a plurality of teeth which project upwardly from the belt body to extend above the track, wherein each looped belt is driven to move through the track, the looped belts being driven to advance together in the second direction for engaging an article to be conveyed in the second direction, and wherein the elevator platform is actuatable to retract the belts on the drive frames below said main conveying surface and to extend the belts above said surface to lift an article being conveyed on said spaced parallel rollers and advance it in the second direction.

12. The transfer conveyor assembly of claim 11 wherein the each belt plurality of teeth are separated from one another by intervening slots.

13. The transfer conveyor assembly of claim 11 further comprising:
   portions of each track which define openings beneath the belt supported within the track channel; and
   a rotatable bearing mounted within each of said track openings, the bearings arranged to rotate about axes extending in the first direction, such that an interior surface of the belt body engages the bearings to support the belt as it extends through the track.

14. The transfer conveyor assembly of claim 11 wherein each belt drive frame has pulleys mounted thereto on opposite ends of the track, the belt traveling around the pulleys to pass around at least one drive roller, the drive roller rotating to cause the belt to advance through the track.

15. The transfer conveyor assembly of claim 14 further comprising a guide support bracket mounted to the elevator platform extending beneath the tracks of the belt drive frames, and wherein a guide member is mounted to the guide support bracket with respect to each belt as it extends below the at least one drive roller, each guide member having two guide walls spaced in the first direction and positioned on opposite sides of an associated one of the looped belts, thereby restricting the displacement of said associated belt in the first direction.

16. The transfer conveyor assembly of claim 11 wherein the actuator comprises:
   a motor mounted to the base;
   a cam mounted on a cam shaft which rotates about an axis, the cam having exterior cam surface portions which are radially more distant from the axis than other exterior cam surface portions;
   a clutch which selectively engages the motor with the cam shaft; and
   a cam follower roller mounted within a bracket, wherein the bracket is fixed to a downwardly facing underside of the elevator platform, wherein the cam follower roller engages the exterior cam surface portions, such that when the cam follower roller engages the radially more distant portions, the elevator platform is elevated a greater distance above the base than when the cam follower roller engages the other exterior cam surface portions.

17. A conveyor assembly comprising:
a base;
an elevator platform mounted to the base for vertical motion;
an actuator which engages the elevator platform and which is operable to raise and lower the elevator platform;
a plurality of belt drive frames mounted to the elevator platform, the belt drive frames being spaced from one another in a first direction, wherein each belt drive frame comprises two upright segments which are spaced from one another in a second direction which is perpendicular to the first direction, the upright segments being connected by an upper segment, and wherein a pulley is mounted to each upright segment, a central opening being defined between the upright segments and below the upper segment, the central openings of the plurality of drive frames aligned to define an unobstructed volume extending in the first direction;
a plurality of tracks, one track mounted to each belt drive frame upper segment, the track being positioned between the pulleys on the upright segments, and having a channel therein;
a looped belt mounted to each belt drive frame for advancement in the second direction, each belt having a body which extends within the track channel, wherein each belt has a plurality of teeth which are spaced from one another in the direction of advancement of the belt, the teeth projecting upwardly from the belt body to extend above the track, wherein each looped belt is driven to move through the track and about the pulleys, the looped belts being driven to advance together in the second direction for engaging an article to be conveyed in the second direction, and wherein the elevator platform is actuatable to retract the belts on the drive frames below a surface over which an article is conveyed and to extend the belts above said surface to lift an article being conveyed and advance it in the second direction.

18. The conveyor assembly of claim 17 further comprising:
portions of each track which define openings beneath the belt supported within the track channel; and
a plurality of rotatable bearings mounted within each of said track openings, the bearings arranged to rotate about axes extending in the first direction, such that an interior surface of the belt body engages the bearings to support the belt as it extends through the track.

19. The conveyor assembly of claim 17 wherein an upright segment of each belt drive frame has portions defining a drive hole, and further comprising:
   a drive roller which extends through the drive holes of all the belt drive frames, the belts extending around the drive roller;
   a guide support bracket mounted to the elevator platform extending beneath the tracks of the belt drive frames, and wherein a guide member is mounted to the guide support bracket with respect to each belt as it extends below the drive roller, each guide member having two guide walls spaced in the first direction and positioned on opposite sides of an associated one of the looped belts, thereby restricting the displacement of said associated belt in the first direction.

* * * * *